United States Patent [19]

Iwasaki

[11] 4,322,973

[45] Apr. 6, 1982

[54] ACCELERATION AND DECELERATION SENSOR

[75] Inventor: Shinichiro Iwasaki, Auburn Heights, Mich.

[73] Assignee: Aisin Seiki Company, Limited, Kariya, Japan

[21] Appl. No.: 182,704

[22] Filed: Aug. 29, 1980

[51] Int. Cl.³ ............................................ G01D 15/11
[52] U.S. Cl. .................................. 73/517 R; 324/209
[58] Field of Search .......................... 73/517 R, 517 B; 324/207, 208, 209

[56] References Cited

U.S. PATENT DOCUMENTS 2,487,793 11/1949 Esval et al. .................... 73/517 R X
3,007,063 10/1961 Harris .......................... 73/517 R X

OTHER PUBLICATIONS

"Force and Displacement Transducers Using Single Amorphous Core Multivbator Bridge" by Mohri et al. from *Elec. Engr. in Japan*, vol. 99, No. 2, 1979, pp. 105–112, Feb. 1979.

*Primary Examiner*—James J. Gill
*Attorney, Agent, or Firm*—Oblon, Fisher, Spivak, McClelland & Maier

[57] ABSTRACT

An acceleration or deceleration sensor is provided which includes a casing, a core disposed within the casing having an elastic member and a magnetically soft member of an amorphous metal that is integrally bonded to the elastic member, and an electrical coil wound around the core.

6 Claims, 20 Drawing Figures

TENSION

FIG. 1

TENSION

FIG_2a

FIG_2b

FIG_3a

FIG_3b

FIG_6a

FIG_6b

FIG_6c

FIG_6d

COMPRESSION

FIG_8f

ACCELERATION AND DECELERATION SENSOR

BACKGROUND OF THE INVENTION

1. Field of the Invention

This invention relates to an acceleration or deceleration sensor for converting a variation in speed to an electrical signal, and more particularly to an acceleration or deceleration sensor of the type wherein a variation in stress caused in a magnetically soft member of an amorphous metal, upon either acceleration or deceleration, is converted to a corresponding electrical signal.

2. Description of the Prior Art

A conventional acceleration or deceleration sensor of the type contemplated by this invention uses a semiconductor which forms a strain gauge and obtains an acceleration or deceleration detecting signal by converting a change in resistance proportional to an acceleration or deceleration signal, into an analog voltage. This sensor provides only a small change in resistance that is proportional to an acceleration or deceleration, and it requires complicated circuitry to be associated therewith for noise prevention.

In addition, the working temperature range of the sensor is between about $-30°$ to $+100°$ C. since the semiconductor used therewith is very susceptible to temperature drift.

SUMMARY OF THE INVENTION

An object of this invention is to provide an acceleration or deceleration sensor which requires relatively simple electrical processing of a detected acceleration or deceleration signal.

Another object of this invention is to provide an acceleration or deceleration sensor which is not substantially susceptible to temperature drift and which has improved mechanical strength, stability and durability.

A further object of this invention is to provide an acceleration or deceleration sensor which is capable of reading acceleration or deceleration data with a relatively simple read logic in the form of a large scale integrated circuit as used in a microcomputer.

In accordance with this invention, an electrical coil wound around a bobbin is provided within a casing, a core formed of a magnetically soft member of an amorphous metal is fixed to an elastic member inserted through an opening in the bobbin, one end of the core is fixed within the casing and the other end of the core is provided with a swinging weight. The magnetically soft member of an amorphous metal is linked with the weight so that stress proportional to acceleration or deceleration is developed by a load applied by the elastic member. The number of turns of the electrical coil is such that the magnetically soft member of an amorphous metal can be magnetically saturated by application of a relatively low voltage or a relatively low current level.

The time T required for a current through the electrical coil to reach a predetermined level upon application of a voltage to the coil can be expressed by the formula:

$$T = (N/E)\Phi \tag{1}$$

wherein E is the voltage applied, N is the number of turns in the coil, and $\Phi$ is the difference between the residual flux density and the flux density for a magnetic field developed at a predetermined current level.

The parameter $\Phi$ is in direct proportion to the permeability of the magnetically soft member of amorphous metal. When stress, e.g., a tensile stress, is developed in the magnetically soft member, its permeability, hence $\Phi$, increases with the increase in such stress. If a compressive stress is developed, the permeability, i.e., $\Phi$, decreases with the increase in the stress. Accordingly, the time T required for a current through the electrical coil to reach a predetermined level upon application of a voltage to the coil increases with the tensile stress developed in the magnetically soft member and decreases with the compressive stress developed in the member. Therefore, the acceleration or deceleration sensor of this invention is connected to an electrical circuit or a semiconductor electronic device which determines the value of T and provides an electrical signal in the form of a voltage level or a digital code indicative of such value. The magnetically soft member of amorphous metal is formed as a thin sheet because it must be manufactured by quenching a liquid phase metal. In addition, the magnetically soft member exhibits ferromagnetism and has a high level of magnetic saturation and permeability and a low level of coercive force, whereas it has a very high break-strength, high resiliency and stability, and undergoes an appreciably small change in characteristics due to temperature changes as compared with a semiconductor. These characteristics of the magnetically soft member of amorphous metal are advantageously used in the acceleration or deceleration sensor of this invention. From an electrical viewpoint, the sensor of this invention facilitates signal processing and provides higher accuracy in the determination of the value of T. From a mechanical viewpoint, a sensor of increased durability which is not susceptible to temperature drift can be manufactured with ease.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts throughout the several views, and wherein:

FIG. 2b graphically illustrates the waveforms of input and output signals to or from the processing circuit in FIG. 2a;

FIG. 3b graphically illustrates the waveforms of input and output signals to and from the processing circuit shown in FIG. 3a;

FIG. 4 is a block diagram of a counter circuit which converts to a digital code a delay time td between input and output pulses from the processing circuit shown in FIG. 3a;

DETAILED DESCRIPTION OF THE PREFERRED EMBODIMENTS

Figure 1:
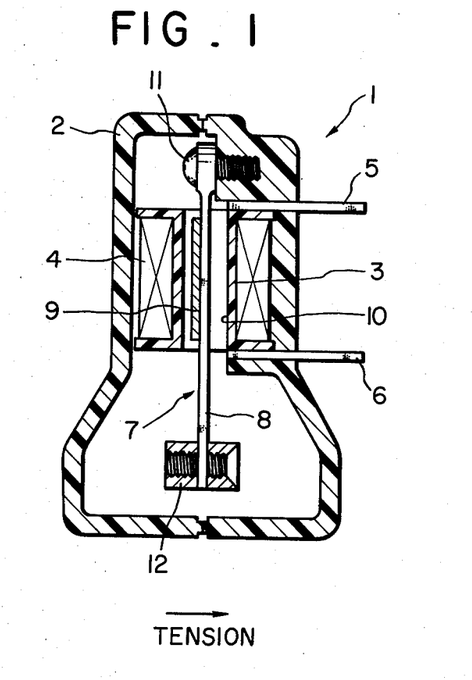
FIG. 1 is a longitudinal sectioned view of an acceleration or deceleration sensor according to one embodiment of the invention.

In the embodiment shown in FIG. 1, the acceleration or deceleration sensor 1 has a resin casing 2. A bobbin 3 is fixed within the casing 2, and an electrical coil 4 is wound around the bobbin 3. The two ends of the coil 4 are connected to terminals 5 and 6. A core 7 has an elastic member 8 made of an epoxy resin, vinyl chloride or beryllium copper, and a magnetically soft member 9 of amorphous metal bonded to the outer left side of the elastic member 8. The core 7 is guided through an opening 10 in the bobbin 3. The upper end of the elastic member 8 is fixed within the casing 2 by means of bolt 11 and the lower end thereof is fixed to a weight 12.

Hence, the core 7 allows the weight 12 to swing about the bolt 11.

A magnetically soft material exhibiting permeability ($\mu$max > $10^3$) and low coercive force (< 1.0 Oe) is used in this invention. (Some magnetically soft materials are described in Hasegawa et al., "Soft Magnetic Properties of Metallic Glasses—Recent Developments," *J. Appl. Phys.* 50(3), March, 1979, pp. 1551–1556. Magnetically soft materials are sold under the trademark MET-GLAS(TM) by Allied Chemical Corp.).

When deceleration occurs, the weight 12 swings counterclockwise about the bolt 11, whereupon a tensile load develops in the left side of the core 7 and a compressive load develops in the right side of the core. The tensile load developed in the left side of the core acts on the magnetically soft member 9 of amorphous metal to develop a tensile stress.

When acceleration occurs, the weight 12 swings clockwise about the bolt 11 and a compressive load develops in the left side of the core 7 and a tensile load develops in the right side of the core. The compressive load developed in the left side of the core acts on the magnetically soft member 9 of amorphous metal to develop a compressive stress.

Figure 2A:
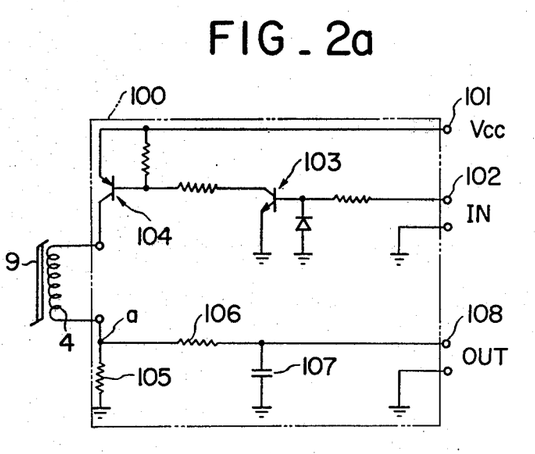
FIG. 2a is a circuit diagram of an electrical process circuit, connected to the acceleration or deceleration sensor shown in FIG. 1, for producing an analog voltage of a level which depends upon the acceleration or deceleration detected.

FIG. 2a depicts an electrical processing circuit 100 for use with the sensor 1 set forth in FIG. 1. The circuit 100 includes a terminal 101 to which a given level of d.c. voltage (on the order of +5 V, for example) from a constant voltage supply is applied. The circuit also includes an input terminal 102, to which a voltage pulse having a frequency on the order of 5-25 kHz, for example, is applied. An NPN transistor 103 which has its bases connected to the terminal 102 conducts during the time the pulse voltage remains positive, and does not conduct when the pulse voltage assumes a ground level. A PNP transistor 104 is turned on and off when the transistor 103 is turned on and off, respectively. Hence, the supply voltage (Vcc) is applied to the electrical coil 4 during the time the voltage pulse applied to the input terminal 102 remains positive, while no voltage is applied thereto during the time the pulse voltage remains at the ground level. A voltage proportional to a current flow through the coil 4 is developed across a resistor 105, and is integrated by an integrator formed by a resistor 106 and a capacitor 107. The integrated voltage from the integrator appears at an output terminal 108.

Figure 2B:
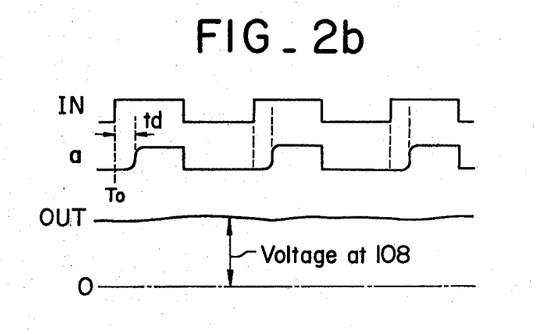

FIG. 2b graphically illustrates the waveforms of the input and the output voltages of the circuit shown in FIG. 2a. The delay time td between the time when the input voltage (IN) rises to a plus (+) level and the time when the voltage across the resistor 105 exceeds a given level, as well as the integrated voltage Vx which represents an integral of the voltage (a) across the resistor 105 depend on the stress developed in the magnetically soft member 9 of amorphous metal.

Figure 3A:
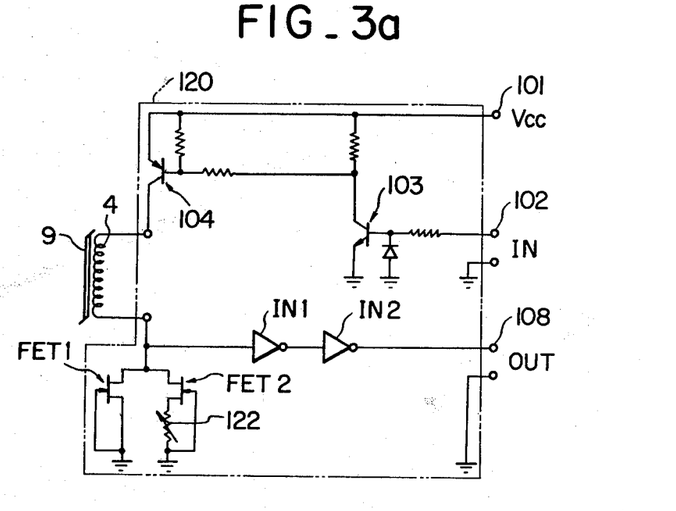
FIG. 3a is a circuit diagram of another electrical processing circuit, connected to an acceleration or deceleration sensor shown in FIG. 1, for deriving a pulse indicative of a delay time which depends upon the acceleration or deceleration detected.

FIG. 3a illustrates another electrical processing circuit 120. During the time when the input voltage (IN) remains positive, NPN transistor 103 is turned on and PNP transistor 104 is turned off, thus inhibiting the application of any voltage to the coil 4. During the time input voltage (IN) assumes the ground level, the transistor 103 is turned off and PNP transistor 104 is turned on. A pair of junction N-channel field effect transistors FET 1 and FET 2 form a constant current source which maintains a constant current flow through the coil. The current level through FET 2 can be adjusted by means of a variable resistor 122. The voltage developed at the terminal of the coil that is connected to FET 1 and FET 2 is fed to a pair of cascade-connected inverting amplifiers IN 1 and IN 2 for amplification and shaping.

Figure 3B:
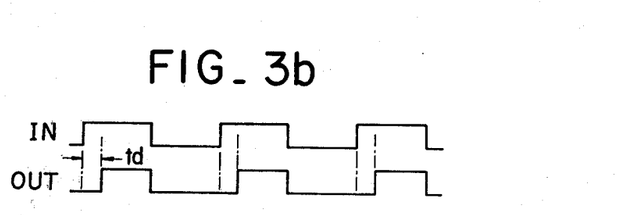

FIG. 3b graphically illustrates the waveforms of the input and output voltages of the circuit of FIG. 3a. The circuit 102 produces an output (OUT) which is a voltage pulse delayed by a delay time td with respect to an input pulse (IN), and the value of td depends on the stress developed in the magnetically soft member 9 of amorphous metal.

Figure 4:
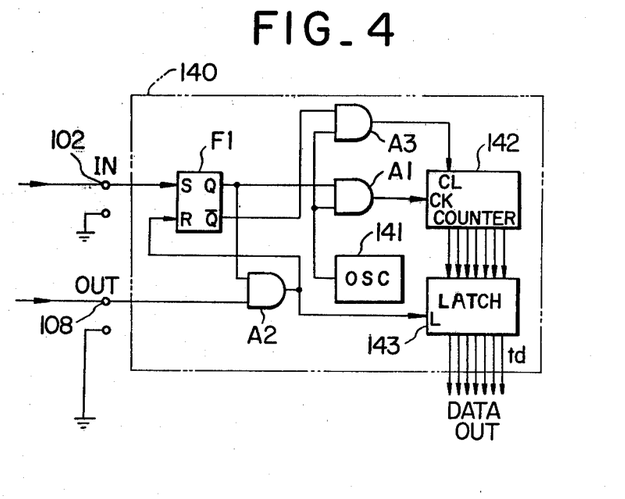

FIG. 4 shows a counter circuit 140 which converts the value of td into a corresponding digital code. In the circuit 140 of FIG. 4, the rising end of an input voltage (IN) sets a flip-flop F1, whereupon its Q output assumes a high level of "1," and an AND gate A1 is enabled to pass a pulse produced by a clock pulse oscillator 141 to a count pulse input CK of a counter 142. An output pulse (OUT) and the Q output of the flip-flop F1 are applied to an AND gate A2, which produces a high level or "1" when the output pulse (OUT) rises to a high level. At this point in time, the flip-flop F1 is reset and its Q output assumes a low level or "0." This disables the AND gate A1, and the supplying of a clock pulse to the counter 142 is interrupted. At the time when the AND gate A2 produces a "1" output, a code indicative of the count in the counter 142 is stored in a latch 143. After the flip-flop F1 is reset and the latch 143 has been loaded with the count code, and AND gate A3 passes a clock pulse to clear the counter 142. An output code from the latch 143 indicates the number of clock pulses passed during the time interval of td, and hence represents the value of td.

Figure 5:
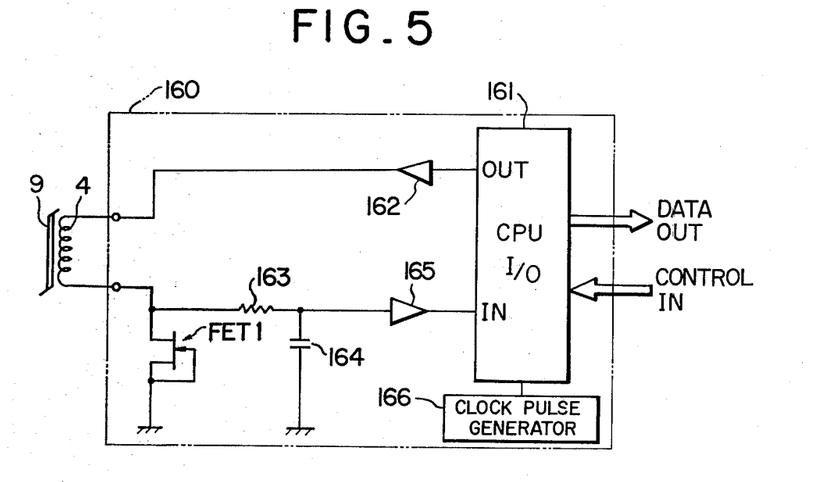
FIG. 5 is a block diagram of an electronic processing unit which is connected to the acceleration or deceleration sensor shown in FIG. 1 for determining the time lag of the rising end of a current flow through an electrical coil of the sensor in response to a pulse applied thereto from a single-chip microcomputer.

An electronic processing unit 160 shown in FIG. 5 comprises a single-chip microcomputer (a large-scale integrated semiconductor unit) 161, an amplifier 162, a junction N-channel field effect transistor FET 1 which acts as a constant current source, a resistor 163, a capacitor 164, an amplifier 165 and a clock pulse oscillator 166. The combination of the resistor 163 and the capacitor 164 forms a filter which removes voltage oscillations of higher frequencies than the frequency of input and output pulses. The microcomputer 161 forms pulses of a given frequency in a range from 5 to 30 kHz in response to the clock pulse, and feeds such pulses to the amplifier 162. The microcomputer 161 also monitors the voltage developed at the junction between the N-channel FET 1 and one end of the coil 4, or the output voltage of the amplifier 165, and counts the clock pulses which are developed between the time when the pulse it has supplied rises to a given level and the time when the output voltage of the amplifier 165 rises to a given level. Such time interval corresponds to td, and the microcomputer forms an output code indicative of the value of td, (DATA OUT).

The acceleration or deceleration sensor 1 shown in FIG. 1 produces, as will be described hereinafter, an electrical signal in response to acceleration or deceleration by means of the electrical processing circuits 100, 120 or 140 or logic processing unit 160. When deceleration occurs, the weight 12 in the sensor 1 swings to develop a tensile load in the left side of the core 7 which is converted to a tensile stress in the magnetically soft member 9 of amorphous metal. The conversion of the tensile stress to an electrical signal, in the magnetically soft member 9, is described by reference to the experimental data shown in FIGS. 6e and 6f.

As shown in FIGS. 6a to 6d, a core 7 is disclosed comprising an elastic member 8 which has formed thereon two parallel sets of magnetically soft members 9 of amorphous metal. Each set consists of two members integrally bonded with an epoxy adhesive. The left end of the core 7 is fixed to a vise 13 with the magnetically soft members 9 facing up. A push-pull gauge (not shown) is used to impose a load on a point 5 mm away from the right end of the core in a direction indicated by X, to thereby determine Vx and td, for a tensile load x applied to the magnetically soft member 9 of amorphous metal. The specific values of various parameters (including the dimensions a, b, c, d and e) and the material of the magnetically soft member 9 as well as data obtained are set forth in Table 1 below as listed in Case Nos. 1 and 2.

TABLE 1

Figure 6A:
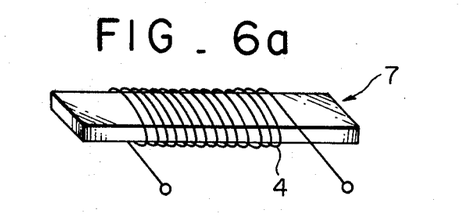
FIG. 6a is a perspective view of a core as used in an experiment wherein a load was applied to one end of the core to determine an output voltage Vx and delay time td for the load applied.
Figure 6B:
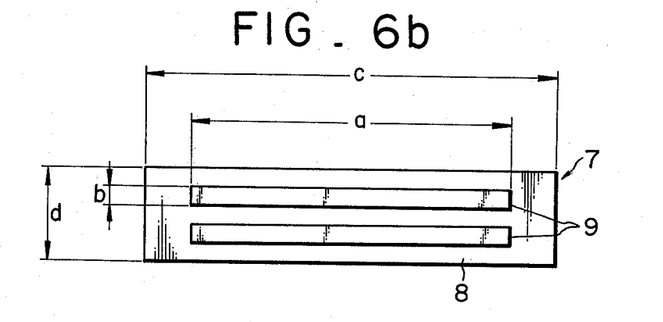
FIG. 6b is a plan view of the core shown in FIG. 6a, with the electrical coil omitted.
Figure 6C:
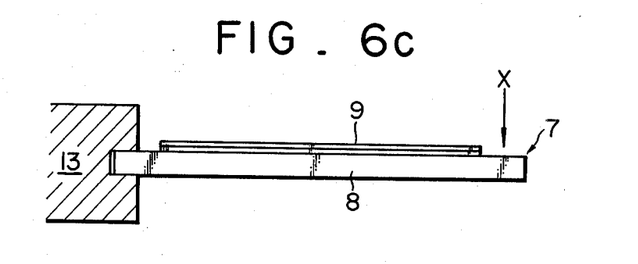
FIG. 6c is a front view illustrating the relative position of a magnetically soft member of amorphous metal in the core of FIGS. 6a and 6b wherein a tensile load is applied to the magnetically soft member with the electrical coil omitted.
Figure 6D:
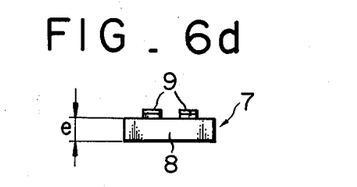
FIG. 6d is a right side view of FIG. 6c.
Figure 6E:
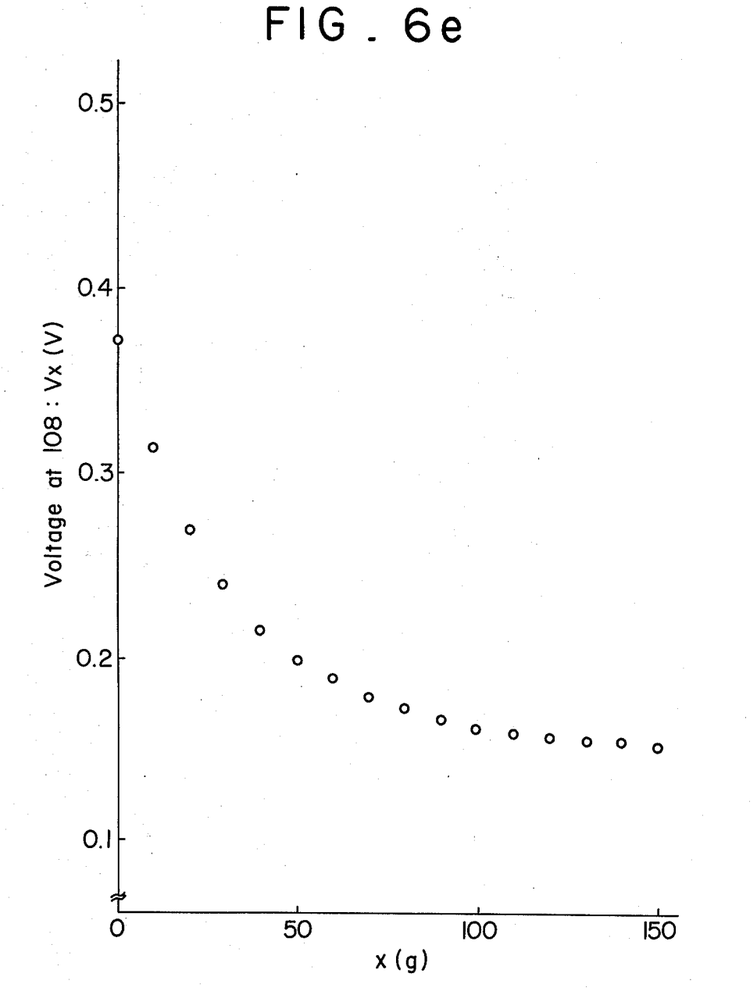
FIG. 6e is a graph illustrating the tensile load x versus the output voltage Vx relation obtained by connecting the electrical coil to the electrical processing circuit of FIG. 2a using the core whose dimensions and arrangements are specified in FIGS. 6a to 6d.
Figure 6F:
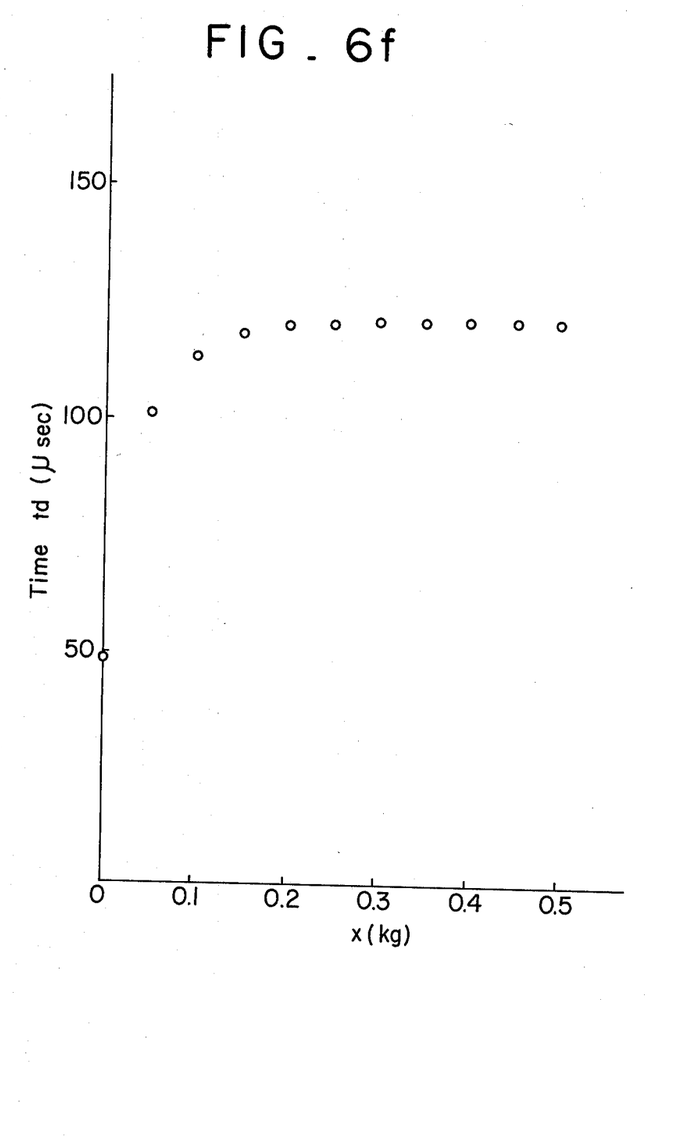
FIG. 6f is a graph illustrating the tensile load x versus delay time td relation obtained by connecting the electrical coil to the electrical processing circuit of FIG. 3a whose dimensions and arrangement are specified in FIGS. 6a to 6d.
Figure 8A:
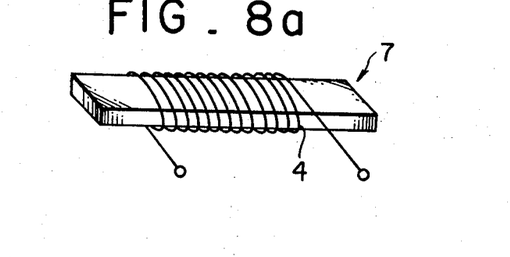
FIG. 8a is perspective view of the core as used in an experiment wherein a load was applied to one end of the core to determine an output voltage Vx and delay time td for the load applied.
Figure 8B:
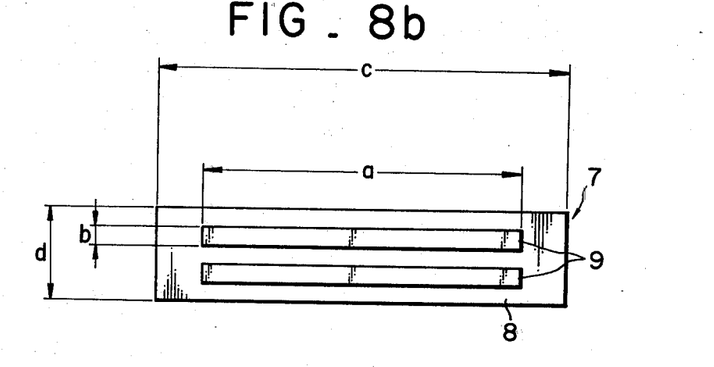
FIG. 8b is a plan view of the core shown in FIG. 8a, with the electrical coil omitted.
Figure 8C:
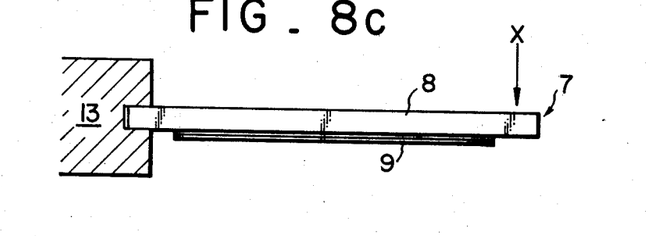
FIG. 8c is a front view illustrating the relative position of the magnetically soft member of amorphous metal in the core of FIGS. 8a and 8b wherein a compressive load is applied to the magnetically soft member with the electrical coil omitted.
Figure 8D:
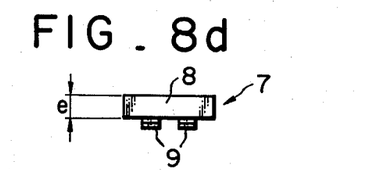
FIG. 8d is a right side view of FIG. 8c.
Figure 8E:
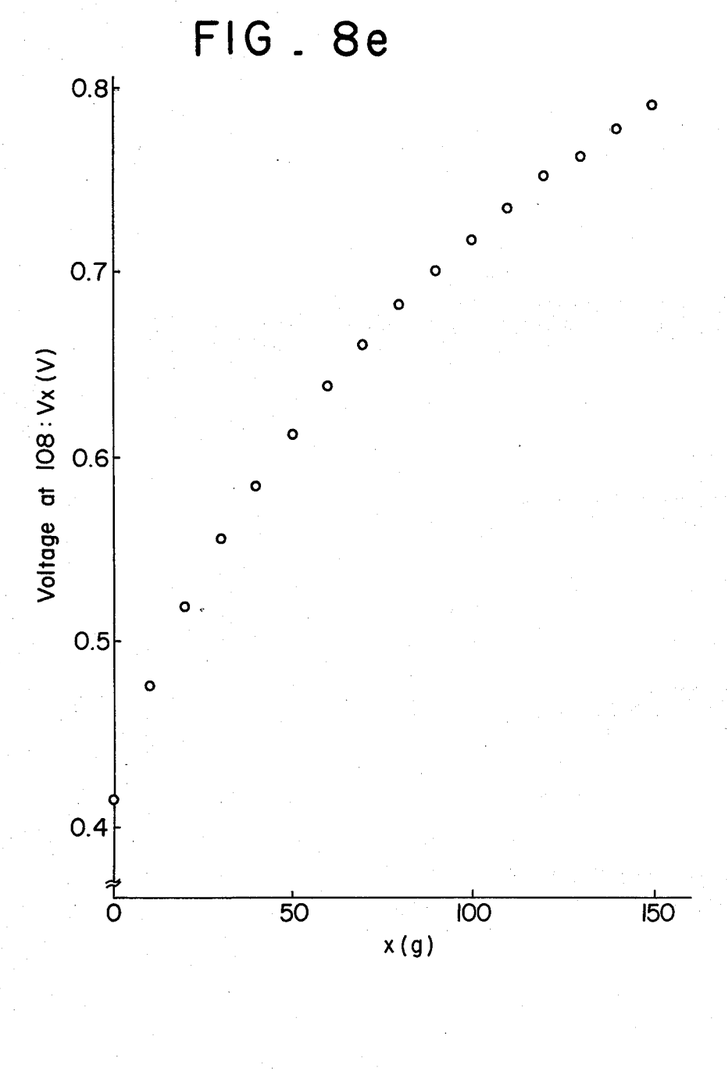
FIG. 8e is a graph illustrating the compressive load x versus the actual voltage Vx relation obtained by connecting the electrical coil to the electrical processing circuit of FIG. 2a using the core whose dimensions and arrangement are specified in FIGS. 8a to 8d.
Figure 8F:
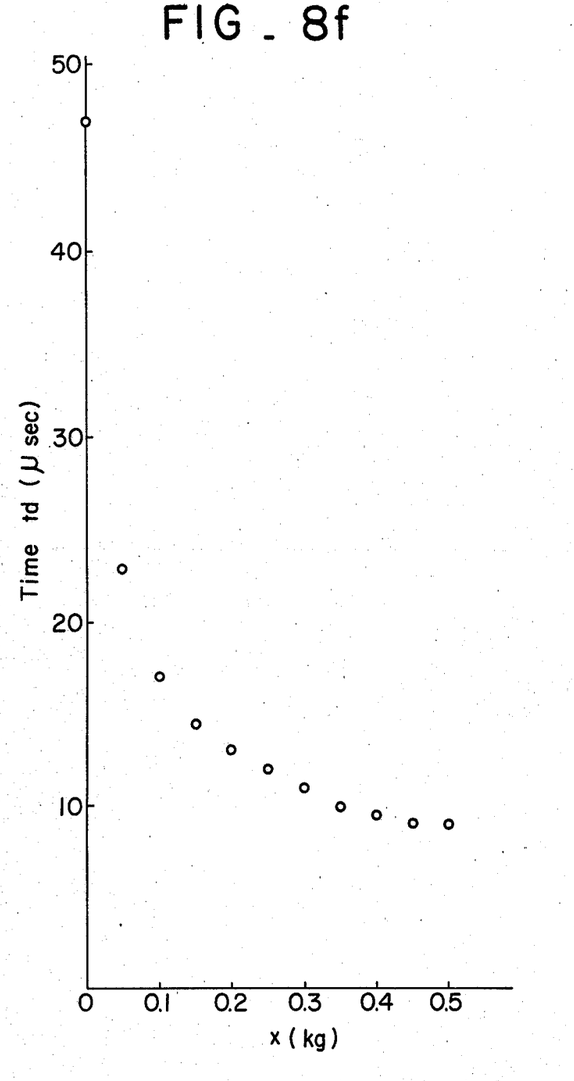
FIG. 8f is a graph illustrating the compressive load x versus the delay time td relation obtained by connecting the electrical coil to the electrical processing circuit of FIG. 3a using the core whose dimensions and arrangement are specified in FIGS. 8a to 8d.

| Case No. | Magnetically soft member 9 of amorphous metal | | | | | Elastic member 8 | | | Coil 4 Number of turns | Measuring means and frequency of input pulse | Data |
|---|---|---|---|---|---|---|---|---|---|---|---|
| | Material Atomic weight percent | Thickness mm | a mm | b mm | Number of sheets | c mm | d mm | e mm | | | |
| 1 | $Fe_{40}Ni_{40}P_{14}B_6$ | 0.058 | 80 | 1.8 | 4 | 95 | 6 | 0.6 | 2000 | Circuit 100,5 Khz | FIG. 6e |
| 2 | " | " | " | " | " | " | " | " | " | Circuit 120 & Synchroscope 100 KHz | FIG. 6f |
| 3 | " | " | " | " | " | " | " | " | " | Circuit 100 5 KHz | FIG. 8e |
| 4 | " | " | " | " | " | " | " | " | " | Circuit 120 & Synchroscope 100 KHz | FIG. 8f |

For Case No. 1, the data of FIG. 6e shows that a voltage Vx of high accuracy is obtained for a tensile load x in the range of from 0 to 100 g. For Case No. 2, the data of FIG. 6f shows that a delay time td of high linearity and which covers a wide range is obtained for a tensile load x in the range of from 0 to 0.1 kg.

Figure 7:
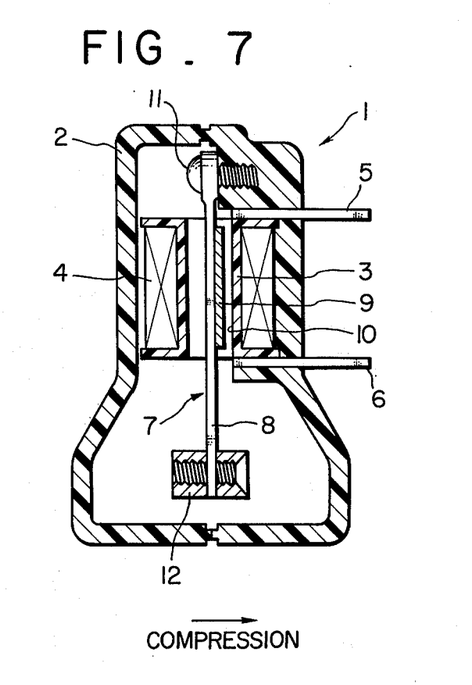
FIG. 7 is a longitudinal sectioned view of an acceleration or deceleration sensor according to another embodiment of the invention.

The second embodiment of this invention is now described by reference to FIG. 7. The acceleration or deceleration sensor 1 has a resin casing 2. A bobbin 3 is fixed within the casing 2, and an electrical coil 4 is wound around the bobbin 3. The two ends of the coil 4 are connected to terminals 5 and 6. A core 7 has an elastic member 8 made of an epoxy resin, vinyl chloride or berryllium copper, and a magnetically soft member 9 of amorphous metal bonded to the outer left side of the elastic member 8. The core 7 is guided through an opening 10 in the bobbin 3 and the upper end of the elastic member 8 is fixed within the casing 2 by means of a bolt 11 and the lower end of the elastic member 8 is fixed to a weight 12. Hence, the core 7 allows the weight 12 to swing about the bolt 11.

When deceleration occurs, the weight 12 swings counterclockwise about the bolt 11, whereupon a compressive load develops in the right side of the core and a tensile load develops in the left side of the core. The compressive load developed in the right side of the core 7 acts on the magnetically soft member 9 of amorphous metal to develop a compressive stress.

When acceleration occurs, the weight 12 swings clockwise about the bolt 11 and a tensile load develops in the right side of the core 7 and a compressive load develops in the left side of the core. The tensile load developed in the right side of the core 7 acts on the magnetically soft member 9 of amorphous metal to develop a tensile stress.

The acceleration or deceleration sensor 1 shown in FIG. 7 produces, as will be described hereinafter, an electrical signal in response to acceleration or deceleration by means of the electrical processing circuit 100, 120 or 140 or the logic processing unit 160. When deceleration occurs, the weight 12 in the sensor 1 swings to develop a compressive load in the right side of the core 7 which is converted to a compressive stress in the magnetically soft member 9 of amorphous metal. The conversion of the compressive stress in the magnetically soft member 9 to an electrical signal is described by reference to the experimental data shown in FIGS. 8e and 8f.

As shown in FIGS. 8a to 8d, a core 7 is disclosed comprising an elastic member 8 which has formed thereon two parallel sets of magnetically soft members 9 of amorphous metal. Each set consists of two members integrally bonded with an epoxy adhesive.

The left end of the core 7 is fixed to a vise with the magnetically soft members 9 facing down. A push-pull gauge (not shown) is used to impose a load on a point 5 mm away from the right end of the core in a direction indicated by X, to thereby determine Vx and td for a tensile load x applied to the magnetically soft member 9 of amorphous metal. The specific values of various parameters (including the dimensions a, b, c, d and e) and the material of the magnetically soft member 9 as well as data obtained are set forth in Table 1 above as listed in Case Nos. 3 and 4.

For Case No. 3, the data of FIG. 8e shows that a voltage Vx of high accuracy is obtained for a compressive load x in the range of from 0 to 150 g. For Case No. 4, the data of FIG. 8f shows that a delay time of high linearity and which covers a wide range is obtained for a compressive load x in the range of from 0 to 0.1 kg and from 0.2 to 0.35 kg.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A sensor for converting detected acceleration and deceleration into an electrical signal indicative thereof, comprising:

a casing;

a core disposed within said casing, said core including an elastic member with one end thereof being fastened to said casing and the other end thereof supporting a weight so as to force said elastic member into a swinging motion under the influence of acceleration and deceleration;

a magnetically soft member of amorphous metal integrally bonded to said elastic member adjacent the fastened end of said elastic member, said magnetically soft member being located on said elastic member such that tensile stress and compressive stress on said magnetically soft member are developed during deceleration and acceleration, respectively; and an electrical coil wound around said core for sensing the stress values in said magnetically soft member and for providing these values to associated circuitry for conversion to deceleration and acceleration values.

2. A sensor according to claim 1 further including a bobbin fixed within said casing; said electrical coil being wound around said bobbin.

3. A sensor according to claim 1 wherein said magnetically soft member of amorphous metal in said core is integrally bonded to at least one side of the elastic member.

4. A sensor according to claim 1 wherein said elastic member is made of one of epoxy resin, polyvinyl chloride and beryllium copper.

5. A sensor according to claim 1 wherein at least one set of said magnetically soft members of amorphous metal in the core is bonded to said elastic member, said at least one set being parallel to said elastic member and consisting of at least one magnetically soft member of amorphous metal.

6. A sensor according to claim 1 wherein said magnetically soft member is integrally bonded to the other side of said elastic member so that tensile stress and compressive stress on said magnetically soft member are developed during acceleration and deceleration, respectively.

* * * * *